US009769069B2

(12) United States Patent
Cui et al.

(10) Patent No.: US 9,769,069 B2
(45) Date of Patent: Sep. 19, 2017

(54) METHODS AND APPARATUS TO PROVIDE A CONSUMER SERVICES CLOUD IN A COMMUNICATIONS NETWORK

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Thomas A. Anschutz, Conyers, GA (US); Alan Blackburn, Woodstock, GA (US); Arthur Richard Brisebois, Cumming, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 111 days.

(21) Appl. No.: 14/683,955

(22) Filed: Apr. 10, 2015

(65) Prior Publication Data
US 2016/0301779 A1    Oct. 13, 2016

(51) Int. Cl.
*H04L 12/28*    (2006.01)
*H04L 12/721*   (2013.01)
(Continued)

(52) U.S. Cl.
CPC .......... *H04L 45/566* (2013.01); *H04L 45/308* (2013.01); *H04L 67/306* (2013.01)

(58) Field of Classification Search
USPC .......... 370/217–225, 252–401; 709/221–231
See application file for complete search history.

(56) References Cited

U.S. PATENT DOCUMENTS

| 7,751,409 B1 | 7/2010 | Carolan |
| 8,825,767 B2 | 9/2014 | Sivavakeesar |

(Continued)

FOREIGN PATENT DOCUMENTS

| EP | 2716115 A1 | 4/2014 |
| WO | 2014147197 A1 | 9/2014 |

OTHER PUBLICATIONS

Csaszar et al., "Unifying Cloud and Carrier Network," Dec. 2013, 6 pages, Proceedings of DCC, Dresden, Germany.
(Continued)

*Primary Examiner* — Man Phan
(74) *Attorney, Agent, or Firm* — Hanley, Flight & Zimmerman, LLC

(57) ABSTRACT

Methods and apparatus to provide a consumer services cloud in a communications network are disclosed. An example method includes obtaining, at a first device in a communications network, network communications transmitted from a client device of a communications network customer that are diverted via a software-defined networking switch. The example method also includes analyzing the network communications to identify which of multiple possible users associated with the communications network customer is a current user of the client device; in response to identifying the current user, accessing a first profile corresponding to the identified current user to determine a rule to be used to handle the network communications within the communications network. The example method also includes configuring the software-defined networking switch to: identify subsequent network communications that correspond to the identified current user of the client device; and handle the subsequent network communications in accordance with the rule.

17 Claims, 10 Drawing Sheets

(51) Int. Cl.
*H04L 12/725* (2013.01)
*H04L 29/08* (2006.01)

(56) References Cited

U.S. PATENT DOCUMENTS

| | | | |
|---|---|---|---|
| 8,849,955 | B2 | 9/2014 | Prahlad et al. |
| 8,995,272 | B2* | 3/2015 | Agarwal ............... H04L 45/245 370/230 |
| 9,467,378 | B1* | 10/2016 | Stark .................... H04L 45/745 |
| 2003/0208596 | A1 | 11/2003 | Carolan et al. |
| 2003/0217125 | A1 | 11/2003 | Brancati et al. |
| 2003/0217129 | A1 | 11/2003 | Knittel et al. |
| 2012/0071168 | A1 | 3/2012 | Tomici et al. |
| 2012/0173875 | A1 | 7/2012 | Mahidhara et al. |
| 2012/0190386 | A1 | 7/2012 | Anderson |
| 2013/0124807 | A1 | 5/2013 | Nielsen et al. |
| 2013/0272305 | A1 | 10/2013 | Lefebvre et al. |
| 2013/0283374 | A1 | 10/2013 | Zisapel et al. |
| 2013/0329734 | A1 | 12/2013 | Chesla et al. |
| 2014/0003232 | A1 | 1/2014 | Guichard et al. |
| 2014/0075557 | A1 | 3/2014 | Balabine et al. |
| 2014/0233385 | A1 | 8/2014 | Beliveau et al. |
| 2014/0269724 | A1 | 9/2014 | Mehler et al. |
| 2014/0328190 | A1 | 11/2014 | Lord et al. |
| 2014/0359697 | A1 | 12/2014 | Ji |
| 2014/0362790 | A1 | 12/2014 | McCann |
| 2015/0172098 | A1* | 6/2015 | Agarwal ............... H04L 45/245 370/217 |
| 2015/0207677 | A1* | 7/2015 | Choudhury ......... H04L 41/0806 370/254 |
| 2015/0207724 | A1* | 7/2015 | Choudhury ........... H04L 45/026 370/255 |
| 2016/0142320 | A1* | 5/2016 | Gyllenhammer ..... H04L 47/125 370/389 |
| 2016/0294670 | A1* | 10/2016 | Pacella .................. H04L 45/02 |
| 2016/0294688 | A1* | 10/2016 | Pacella .................. H04L 45/66 |
| 2016/0301593 | A1* | 10/2016 | Blair .................. H04L 12/4641 |
| 2016/0337937 | A1* | 11/2016 | McCann ................ H04L 45/64 |

OTHER PUBLICATIONS

Kim et al., "Lithium: Event-Driven Network Control," 2012, 14 pages.
Kim et al., "Improving Network Management with Software Defined Networking," Feb. 2013, 6 pages, Communications Magazine.
Lioy et al., "Offloading security applications into the network," 2014, 10 pages, eChallenges e-2014 Conference Proceedings.
Risso et al., "Some Controversial Opinions on Software-Defined Data Plane Services," 2013, 8 pages.
Yang et al., "Eden: Supporting Home Network Management Through Interactive Visual Tools," 2010, 10 pages, Proceedings of the 23nd annual ACM symposium on User interface software and technology, ACM.

* cited by examiner

METHODS AND APPARATUS TO PROVIDE A CONSUMER SERVICES CLOUD IN A COMMUNICATIONS NETWORK

FIELD OF THE DISCLOSURE

This disclosure relates generally to communications networks and, more particularly, to methods and apparatus to provide a consumer services cloud in a communications network.

BACKGROUND

In known communications networks, network functions are performed using specialized hardware that accelerates one or more functions relative to general-purpose machines. Control and configuration of the network is generally performed by accessing a device to be configured and performing configuration tasks specific to the hardware in the device.

BRIEF DESCRIPTION OF THE DRAWINGS

The figures are not to scale. Wherever appropriate, the same reference numbers will be used throughout the drawing(s) and accompanying written description to refer to the same or like parts.

DETAILED DESCRIPTION

Figure 1:
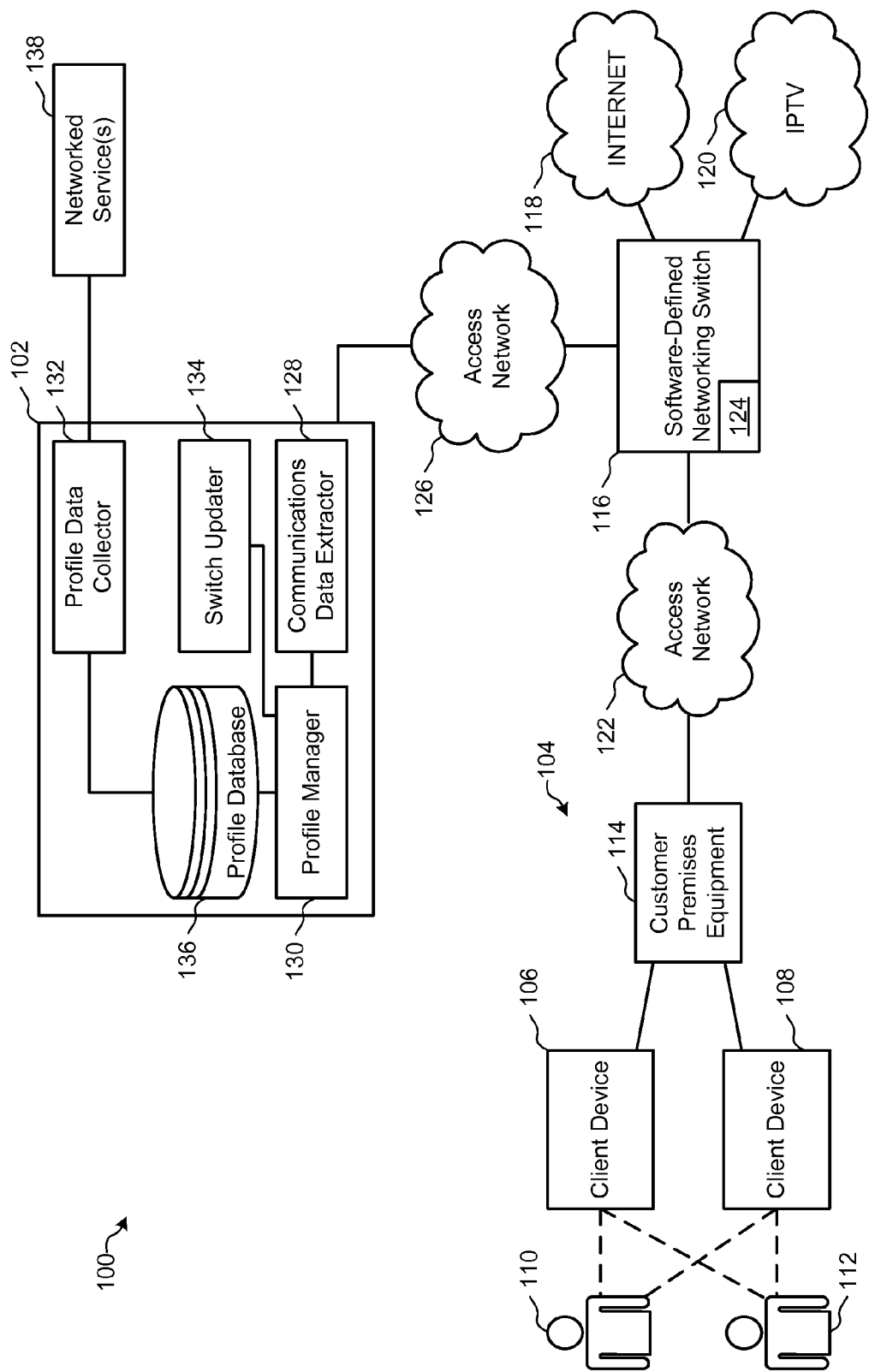
FIG. 1 is a block diagram of an example software-defined networking (SDN) network constructed in accordance with the teachings of this disclosure to provide a consumer services cloud.

Software-defined networking (SDN) is a network technology that addresses customization and optimization concerns within networks. SDN simplifies modern networks by decoupling the data-forwarding capability (e.g. the data plane or forwarding plane) from routing, resource, and other management functionality (e.g., the control plane). Both the control plane and data plane functions are performed at the network nodes in known networks. Network nodes that support SDN (e.g., that are SDN-compliant) may be configured to implement data plane functions. Control plane functions are performed by an SDN controller. SDN networks currently use Application Programming Interface (API) services, such as the OpenFlow protocol or OnePK protocol, to manage the interactions between the data plane and the control plane.

Examples disclosed herein provide communication network service management that is more flexible and more granular than in known networks by using SDN. Examples disclosed herein provide and/or tailor network services on an individual user level, in addition to and/or instead of at a subscriber (e.g., household) level. As used herein, the term "subscriber" is defined to be a person who has subscribed to services provided by a communications network provider. One subscriber's service may include service for multiple other users, but the subscriber (e.g., the account owner, who is also a user) has certain administrative privileges over the service that may not be available to one or more of the other users receiving service via the subscriber.

Disclosed examples disclosed herein leverage the flexibility and ease of configuration of software-defined networks. Disclosed examples configure SDN nodes in the network in individualized ways, such that an SDN node is specifically configured to provide services to the subscribers and/or users that use the SDN node to connect to the network. Furthermore, disclosed examples configure the SDN nodes in real-time to accommodate different types of traffic according to the preferences and subscriptions of the users connected to the SDN nodes. The combination of preferences and subscriptions that are used to configure one of the SDN nodes is highly likely to be unique (e.g., not duplicated at any other SDN node serving other users). Thus, the high degree of flexibility and configurability provided by software-defined networking enables disclosed examples to be quickly and easily tailored to serve individual users.

Disclosed examples enable a wide variety of value-added services to be selectively provided to individuals within a subscriber premises (e.g., multiple individuals using a same access point to connect to a communications network). By implementing such services using infrastructure in the software-defined network, the services can be quickly and efficiently updated (e.g., to reduce security vulnerabilities) by reducing or avoiding reliance on user activity to update the devices.

Examples disclosed herein combine networked services and analyze data provided by the networked services to trigger actions at connected devices via network communications from a consumer services cloud. Such combinations of networked services enable the expansion of capabilities and/or predictive algorithms used by those networked services, rather than limiting networked services to self-contained capabilities. For example, a networked home thermostat, which has a set of self-provided action triggers to heat or cool the home and may receive explicit commands to perform heating or cooling. Examples provide the thermostat with additional triggers based on data obtained from other networked services to which a user is subscribed, such as an automotive telematics system or a virtual private network application that provides information as to whether the user is present at home.

Another example includes automatic configuration of subscriber devices, such as a customer's Slingbox® media placeshifting device to allow users to remotely watch and control television at home from a remote Internet-connected device. Yet another example includes automatically configuring a set top box, in response to identifying a user of the set top box from communications traffic, to honor an identified user's preference and design of how a television program and/or pop-up windows or messages can be displayed on the user's television.

Examples disclosed herein enable the current generation of network gateway devices, or customer premises equipment, to be replaced with less complex devices that offload functions to a consumer services cloud executing in the network. Examples disclosed herein implement virtual residential gateways using devices in the SDN network to reduce the functions required of the physical customer premises equipment. For example, by configuring an SDN switch in the network, a consumer services cloud is configured to provide functions previously provided by a network gateway device at a subscriber premises, such as virtual local area network (VLAN) handling, quality of service (QoS) scheduling, QoS policing, multicast, security (e.g., firewalls), and/or dynamic host configuration protocol (DHCP) relaying. In some examples, the consumer services cloud provides enhanced network gateway functions, such as subscriber authentication and/or network attachment the customer premises equipment and/or subscriber-aware service management. Such reduction in complexity at the customer premises equipment reduces the costs of purchasing or leasing the devices, and/or reduces maintenance and/or repair services that must be provided to the devices due to a reduced number of vectors for malfunction.

An additional example value added service that may be provided by disclosed examples is providing network-based parental control functions (e.g., network usage restrictions). For example, disclosed examples enable parents to specify when and/or what content their kids can access. Unlike known parental control methods, examples disclosed herein are device-independent, location-independent, and/or software-independent.

Another example value added service that may be provided by disclosed examples includes security monitoring of inbound traffic to a device, such as traffic coming from application servers (e.g., keep alive messages, etc.). Disclosed examples may perform pattern matching on traffic, such as comparing source and/or destination IP addresses to known patterns, to perform security risk analyses. Disclosed examples provide notifications to the user regarding the risk level when patterns are matched and/or not matched (e.g. well-known/high risk, well-known/low risk, unknown/high risk, etc.).

Disclosed example methods include obtaining, at a first device in a communications network, network communications transmitted from a client device of a communications network customer that are diverted via a software-defined networking switch. The disclosed example methods also include analyzing the network communications to identify which of multiple possible users associated with the communications network customer is a current user of the client device. The disclosed example methods also include, in response to identifying the current user, accessing a first profile corresponding to the identified current user to determine a rule to be used to handle the network communications within the communications network. The disclosed example methods also include configuring the software-defined networking switch to identify subsequent network communications that correspond to the identified current user of the client device and handle the subsequent network communications in accordance with the rule.

In some examples, the analyzing of the network communications includes analyzing at least one of a message header and a control message, the determining of the rule includes accessing subscription information for the communications network customer, and the configuring of the software-defined networking switch includes configuring the software-defined networking switch to route the subsequent network communications to the communications network in compliance with the subscription information.

In some example methods, the analyzing of the network communications includes identifying authentication information in a request for access to the communications network from the client device and the configuring of the software-defined networking switch includes configuring the software-defined networking switch to route communications between the client device and the communications network when client device is authorized to access the communications network based on the authentication information.

In some examples, the analyzing of the network communications includes analyzing at least one of a message header and a control message, the determining of the rule includes accessing network address translation information for the communications network customer, and the configuring of the software-defined networking switch includes configuring the software-defined networking switch to perform network address translation on the subsequent communications.

In some example methods, the analyzing of the network communications includes analyzing at least one of a message header, a control message, or a type of an application that generated the network communications, the determining of the rule includes accessing user network access control information configured by an authorized person associated with the communications network customer, and the configuring of the software-defined networking switch includes configuring a forwarding table of the software-defined networking switch to selectively block the subsequent network communications to comply with the user network access control information.

Some example methods further include obtaining, at the first device, second network communications destined for the client device that are diverted by the software-defined networking switch. The example methods also include analyzing the second network communications based on a security rule to identify a security risk of the second network communications. The example methods also include transmitting a notification to the client device including an identification of the security risk. The example methods also include configuring a forwarding table of the software-defined networking switch to comply with a response obtained from the client device to the notification.

In some examples, the configuring of the software-defined networking switch to handle the subsequent network communications in accordance with the rule includes configuring the software-defined networking switch to route the subsequent network communications without re-directing the subsequent network communications to the first device.

In some examples, the client device includes a computing device connected to the communications network via customer premises equipment. In some examples, the client device includes a mobile device connected to the communications network via a wireless communications network base station.

Disclosed example apparatus include a processor and a computer readable storage medium including computer readable instructions. In disclosed example apparatus, the instructions, when executed, cause the processor to perform operations including analyzing network communications transmitted from a client device of a communications network customer to identify which of multiple possible users associated with the communications network customer is a current user of the client device. In the disclosed example apparatus, the network communications are diverted to the apparatus by a software-defined networking switch. In the disclosed examples, the operations also include accessing, in response to identifying the current user, a first profile corresponding to the identified current user to determine a rule to be used to handle the network communications within the communications network. In disclosed examples, the operations further include configuring the software-defined networking switch to identify subsequent network communications that correspond to the identified current user of the client device and handle the subsequent network communications in accordance with the rule.

In some examples, the client device includes a computing device connected to the communications network via customer premises equipment. In some examples, the client device includes a mobile device connected to the communications network via a wireless communications network base station.

In some example apparatus, the operations further include processing information from a networked service to identify a pattern and storing at least one of the pattern and an action that is responsive to the pattern in association with the identified current user. The example apparatus also include configuring the software-defined networking switch to take the action based on identifying traffic corresponding to the pattern and the identified current user.

In some examples, the processing of the information from the networked service to identify the pattern includes processing information from multiple, separate networked services to identify behaviors associated with the multiple, separate networked services.

FIG. 1 is a block diagram of an example software-defined networking (SDN) network 100 to provide a consumer services cloud. The example SDN network 100 of FIG. 1 includes a consumer services cloud provider 102 that selectively provides services to individuals via devices connected to the SDN network 100. In the example of FIG. 1, the consumer services cloud provider 102 provides services for a subscriber premises 104. The example subscriber premises 104 of FIG. 1 includes multiple client devices 106, 108 that may be used solely and/or interchangeably by multiple individuals (e.g., users) 110, 112. The example devices 106, 108 may be any computing or processing devices capable of network communication.

The example subscriber premises 104 further includes customer premises equipment 114 (CPE) that connects the devices 106, 108 to the SDN network 100. The CPE 114 of FIG. 1 is a residential gateway device that transmits and receives communications between a first interface (e.g., a local interface such as Ethernet or Wi-Fi) and a second interface (e.g., an external interface, such as an ADSL interface, a coaxial cable interface, or a fiber-optic interface).

Figure 2:
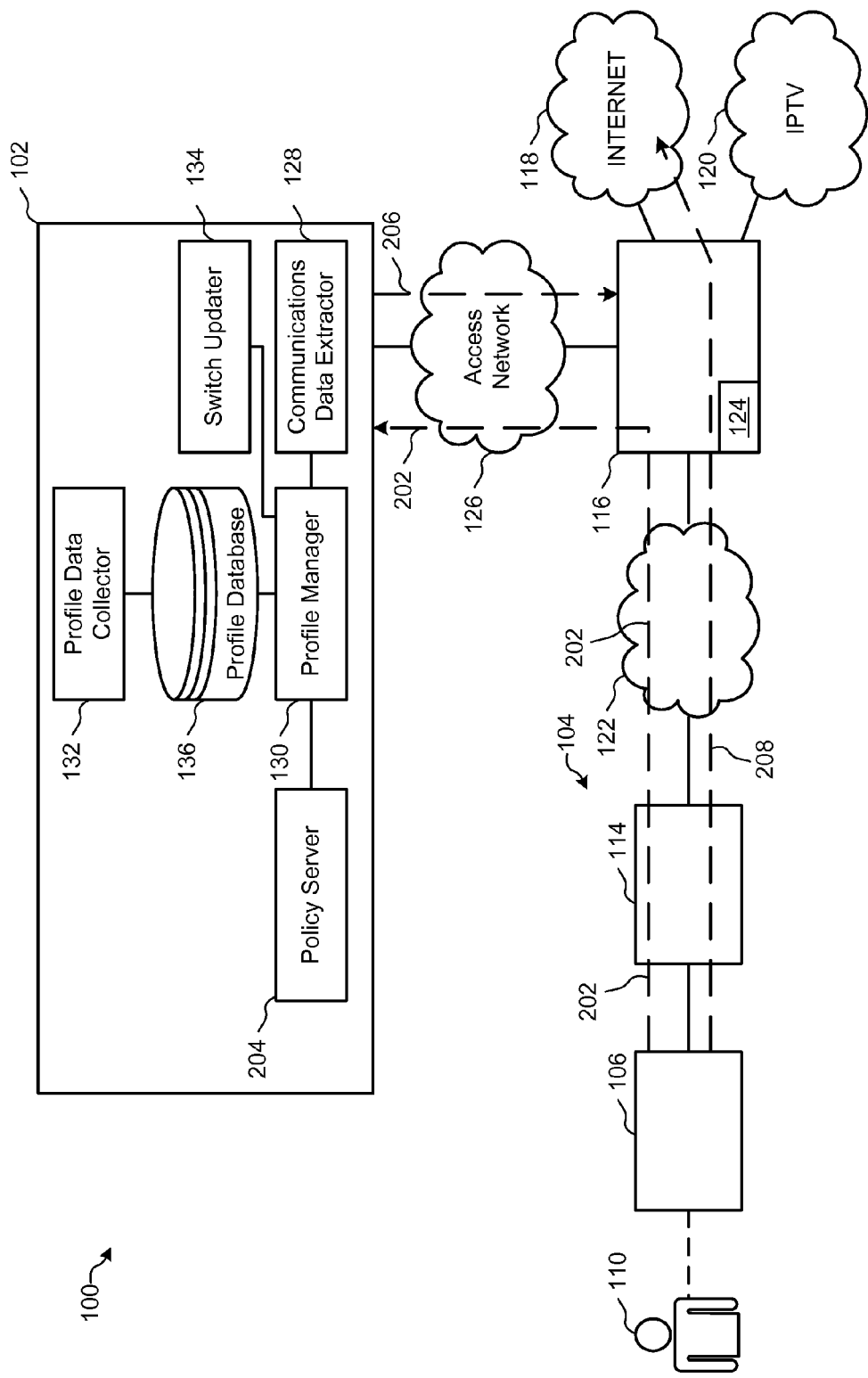
FIG. 2 is an example implementation of the example SDN network of FIG. 1 in which the consumer services cloud analyzes traffic from a client device to configure a software-defined networking switch in the SDN network according to a user profile.

While known residential gateways provide a set of functions including DHCP, DNS bridging, routing, network address translation, quality of service, and authentication, the example CPE 114 of FIG. 1 is a less complex device that provides routing and authentication. In some examples, the CPE 114 further includes DHCP and/or DNS capabilities to provide backup for these functions. In the example of FIG. 2, the CPE 114 is compatible with SDN protocols, such as the Open Flow protocol, enabling the CPE 114 to be dynamically configured (e.g., by the consumer services cloud provider 102).

The example CPE 114 may be provided with a smaller set of features (compared to known residential gateways) because the example consumer services cloud provider 102 functions as a virtual residential gateway with respect to omitted functions. For example, the consumer services cloud provider 102 provides one or more of DHCP functions, DNS functions, and/or network address translation. The example consumer services cloud provider 102 additionally or alternatively provides firewall and/or other security functions that have typically been performed for a subscriber premises via a firewall (e.g., software firewall(s) executed on the devices 106, 108 and/or firewalls implemented in routers via a combination of hardware, firmware, and/or software).

Communications transmitted and received by the CPE 114 are routed through an SDN switch 116. The example SDN switch 116 acts as a customer edge router that connects the subscriber premises 104 to wide area networks (WANs) such as the Internet 118 and/or an Internet protocol television (IPTV) network 120. The example CPE 114 is connected to the SDN switch 116 via an access network 122. The example SDN switch 116 of FIG. 1 routes traffic to and from the CPE 114 based on a forwarding table 124. The example SDN switch 116 of FIG. 1 conforms to the OpenFlow standard of communications interfaces. However, the SDN switch 116 may additionally or alternatively implement any other SDN protocols and/or interfaces.

To provide services to the devices 106, 108 in the subscriber premises 104, the example consumer services cloud provider 102 communicates with the SDN switch 116 via another access network 126. The example access networks 122, 126 may include one or more network nodes, such as traffic aggregators, routers, and/or any other nodes. The consumer services cloud provider 102 is privileged to configure the SDN switch 116 by, for example, altering the forwarding table 124 to cause the SDN switch 116 to change the routing of one or more traffic flows. For example, the SDN switch 116 may be configured and/or re-configured to change the class of service of traffic from the subscriber premises 104, to drop traffic from the subscriber premises 104, to divert traffic to the consumer services cloud provider 102, and/or perform any other routing activity.

The example consumer services cloud provider 102 of FIG. 1 includes a communications data extractor 128, a profile manager 130, a profile data collector 132, and a switch updater 134. The example consumer services cloud provider 102 may be implemented using one or more physical and/or virtual machines. For example, the consumer services cloud provider 102 may be implemented as a computing cloud, with virtual machines, load balancers, and/or any other appropriate infrastructure. In a computing cloud configuration, virtual machines implementing aspects of the consumer services cloud provider 102 may be migrated between physical machines and/or locations to enhance performance of the SDN network 100.

The example communications data extractor 128 of FIG. 1 receives network communications from the example SDN switch 116. For example, the communications data extractor 128 may receive communications that originated from either of the devices 106, 108 and are destined for one of the wide area networks 118, 120 and/or communications that are destined for either of the devices 106, 108, where the communications are diverted (e.g., routed or mirrored) by the SDN switch 116 to the consumer services cloud provider 102.

The communications data extractor 128 extracts data and/or metadata from the received communications. In some examples, the communications data extractor 128 infers additional data and/or metadata for the received communications based on, for example, patterns of communications that match known patterns. Example data that may be obtained by the communications data extractor 128 includes the information from a message header, such as source and/or destination IP addresses of the traffic, the source and/or destination ports of the traffic, the destination protocol, a traffic pattern (e.g., using multiple packets in a set of communications), a class of services, a quality of service, user credentials, a requested uniform resource locator (URL), and/or an application type. The information extracted may be based on the type of protocol used, such as Internet protocol, Ethernet, virtual extensible local area network (VXLAN) protocols, or any other past, present, or future protocols. However, the example communications data extractor 128 may extract any explicit and/or inferred information from one or more communications.

The example profile manager 130 of FIG. 1 manages user profiles for one or more of the users 110, 112 and determines changes to the SDN network 100 (e.g., configuration changes to the SDN switch 116) to implement the user profiles. The profile manager 130 accesses a profile database 136 that stores profiles for the users 110, 112. Example profiles include IP addresses, network credentials, and network communication rules.

The example profile manager 130 analyzes the data extracted by the example communications data extractor 128 to determine whether the communications correspond to any rules in the retrieved user profile. For example, the communications data extractor 128 analyzes the network communications to identify which of multiple possible users 110, 112 from the subscriber premises 104 is responsible for the communications (e.g., which of the users 110, 112 is the current user of the client device 106, 108 causing the traffic). The example profile manager 130 may request a profile from the profile database 136 based on, for example, the source and/or destination IP addresses of network communications and/or authentication credentials in the traffic. In some examples, the profile manager 130 may cross-reference the source and/or destination IP addresses against a registration database to determine which of the users has been registered or authenticated at the source or destination IP address.

When the profile manager 130 has identified the current user and retrieved the corresponding user profile, the example profile manager 130 determines one or more rules in the profile that are to be used to handle the network communications within the SDN network 100. For example, the profile manager 130 may determine that one or more rules specified in the user profile are to be applied based on data and/or metadata extracted by the communications data extractor 128. Examples of identifying traffic, determining rules, and configuring the SDN switch 116 to implement the rule(s) are described below with reference to FIGS. 2-7.

The example profile data collector 132 collects data to configure rules in the profiles. For example, the profile data collector 132 may provide an interface to enable networked services 138 to report information to the profile data collector 132. Examples of such networked services 138 include home automation services that can report user preferences and/or schedules pertaining to home automation preferences, software services that can provide software preferences, and mobile networks that can provide location information. However, the example profile data collector 132 enables adding of service types and/or combinations of services to enhance the value of the SDN network 100 to subscribers.

The example switch updater 134 of FIG. 1 configures the SDN switch 116 to implement the rule(s) selected by the example profile manager 130. For example, to implement a parental control service via the SDN network 100 (e.g., rather than relying on an application running locally on the devices 106, 108 to implement the same service), the switch updater 134 may configure the SDN switch 116 to identify subsequent network communications that correspond to the rule route any such identified communications in accordance with the rule. As an example, the switch updater 134 may configure the SDN switch 116 to block traffic originating from the user 110 (e.g., via either of the devices 106, 108) that corresponds to a particular port and/or corresponds to a particular application (e.g., a port number that is known to be used by a specified application, such as a game application).

The example profile data collector 132 may receive data from one or more networked services 138 describing preferences and/or activities of the users 110, 112 and/or the devices 106, 108. For example, the data may indicate patterns of behavior by the users 110, 112 and/or settings of the devices 106, 108 (e.g., automated tasks, application preferences, purchased applications, etc.). The example profile data collector 132 collects the data, analyzes the data to recognize patterns, and stores recognized patterns in the user profiles of the corresponding users 110, 112. Additionally, the example profile data collector 132 recognizes patterns between data obtained from different networked services 138 and/or patterns between data obtained from a networked service 138 and data obtained via the communications data extractor 128.

The example networked services 138 may be instructed by the users 110, 112 to provide relevant data to the consumer services cloud provider 102 to enhance the services. For example, the users 110, 112 may access an interface provided by a networked service 138 to opt-in to data sharing with the consumer services cloud provider 102 for the purposes of enabling cooperation between different services to which the users 110, 112 subscribe.

For example, a user 110 instructs a networked home security system service to connect to the consumer services cloud provider 102 to provide information about the home security system, including the installed devices, configurations, and/or other information about the home security system. Separately, the example user 110 instructs a networked automotive telematics system for the user's vehicle to provide information about the vehicle telematics system to the consumer services cloud provider 102. The example profile data collector 132 collects data from the home security system and the vehicle telematics system, and determines that the home security system is typically armed when the vehicle telematics system is active (e.g., when the vehicle is in use, implying that the user is not home). The example profile data collector 132 stores the relationship between the home security system and the vehicle telematics system in the user profile for the user 110 (and/or other users associated with the subscriber premises, when appropriate).

When the profile manager 130 accesses the user profile, the relationship between the vehicle telematics system and the home security system prompts the profile manager 130 to request an update to the configuration of the SDN switch 116 via the switch updater 134. For example, the switch updater 134 may configure the SDN switch 116 and/or other SDN switches in the SDN network 100 to re-direct traffic from the vehicle telematics system (e.g., based on the source and/or destination IP addresses, the source and/or destination ports, the protocol, and/or any other data or metadata obtainable from the vehicle telematics communications) to the consumer services cloud provider 102, where the traffic prompts the consumer services cloud provider 102 to arm the security system at the subscriber premises 104 (e.g., via an application server configured to provide an "arm home security system" reaction in response to the vehicle telematics traffic).

In some examples, the services provided by the consumer services cloud provider 102 are opt-in. For example, services may be subscription services that require subscription, configuration, and/or permission by a subscriber.

FIG. 2 is an example implementation of the example SDN network 100 of FIG. 1 in which the consumer services cloud provider 102 analyzes traffic from a client device 106 to configure the SDN switch 116 according to a user profile. In the example of FIG. 2, the user 110 of FIG. 1 uses the client device 106 to make a request for a network resource (e.g., a web page via the Internet 118, multimedia content from the IPTV network 120, etc.).

In the example of FIG. 2, the client device 106 transmits a request 202 for a network resource such as a web page or a voice over Internet protocol (VoIP) reservation. The request 202 is transmitted (e.g., redirected) to the SDN switch 116 via the CPE 114. For example, the example SDN switch 116 is initially configured to route the request 202 to the consumer services cloud provider 102. For example, the SDN switch 116 may be configured to route any types of traffic that has already been classified for the user 110 (e.g., traffic having combinations of source and/or destination IP addresses, source and/or destination ports, types of applications, and/or other characteristics for which the SDN switch 116 does not have an entry in the forwarding table 124). In the example of FIG. 2, the request 202 represents traffic that has not been previously classified for the example subscriber premises 104.

The example communications data extractor 128 analyzes the request 202 redirected from the SDN switch 116. For example, when the request 202 represents web traffic (e.g., an HTTP GET request for a URL), the example communications data extractor 128 extracts the source and/or destination IP addresses, the source and/or destination ports, and the URL from the request 202.

The example profile manager 130 accesses the profile of the user 110 based on the source IP address extracted by the communication data extractor 128 by looking up the IP address in a network registration database or DHCP database. Using an identification of the user 110 as registered to the source IP address, the example profile manager 130 requests the profile corresponding to the user from the profile database 136. The example profile manager 130 accesses subscriber information in the retrieved profile, such as a subscriber agreement (e.g., a class of service contracted by the subscriber). In some examples, the profile manager 130 further accesses network policy information for the SDN network 100 from a policy server 204.

Based on the data extracted from the request 202, the subscriber information in the profile, and one or more network policies, the example profile manager 130 determines that the request 202, and subsequent requests having the same or similar characteristics, are to be forwarded at the SDN switch 116 using one of the priority queues available to the SDN switch 116. For example, the profile manager 130 may determine that the traffic type is to be forwarded using the high priority queue of the SDN switch 116 when the subscriber agreement is for a high priority class of service and the traffic type and/or the network policies do not provide for exceptions to the contracted class of service.

The example switch updater 134 sends a configuration command 206 to the SDN switch 116. The example configuration command 206 of FIG. 2 instructs the SDN switch 116 to update the forwarding table 124 to handle the request 202, and subsequent requests from the user 110 and/or the device 106 that are the same type of traffic as the request 202, in the manner determined by the profile manager 130. Thus, in the example of FIG. 2, the configuration command 206 causes the SDN switch 116 to include an entry in the forwarding table 124 that causes the SDN switch 116 to use a high priority queue for web traffic originating from the user 110 and/or the device 106, such as when the source IP address of the packet is the registered IP address of the device 106 and the destination port is port 80 (a common web server port).

After configuring the SDN switch 116, the example SDN switch 116 handles subsequent requests 208 from the user 110 and/or the device 106 without redirecting the requests 208 to the consumer services cloud provider 102.

Figure 3:
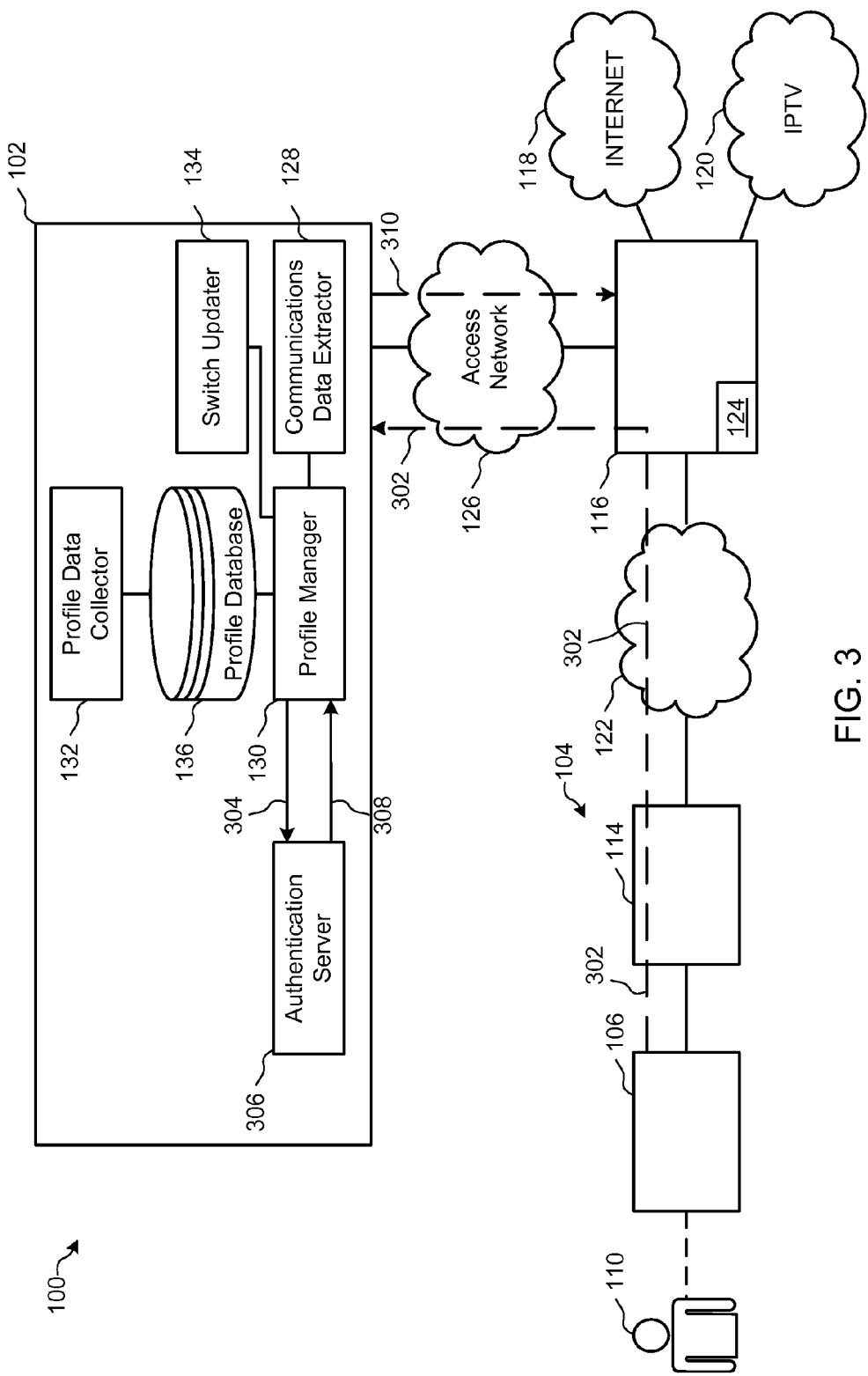
FIG. 3 is an example implementation of the example SDN network of FIG. 1 in which the consumer services cloud provides authentication services and configures the software-defined networking switch in the SDN network to permit the client device to connect to the SDN network.

FIG. 3 is an example implementation of the example SDN network 100 of FIG. 1 in which the consumer services cloud provider 102 provides authentication services and configures the SDN switch 116 to permit the client device 106 to connect to the SDN network 100 (e.g., to connect to the Internet 118 and/or the IPTV network 120).

In the example of FIG. 3, the CPE 114 acts as an authentication client under the Institute of Electrical and Electronics Engineers (IEEE) 802.1X standard. The CPE 114 sends a request 302 for access to the SDN network 100. The example request 302 is compliant with the IEEE 802.1X authentication standard for requesting authentication from an IEEE 802.1X authentication agent.

In the example of FIG. 3, the consumer services cloud provider 102 functions as the authentication agent under the IEEE 802.1X standard. The example SDN switch 116 receives the request 302 via the access network 122 and forwards the request 302 to the consumer services cloud provider 102. The example communications data extractor 128 identifies the request 302 as an authentication request in compliance with IEEE 802.1X, and extracts the authentication information from the request 302. Example authentication information may include a digital certificate, a user name, and/or a password.

The example profile manager 130 sends an authentication request 304, including the extracted authentication data, to an authentication server 306. The example authentication server 306 determines whether the credentials provided in the request 302 (e.g., via the authentication request 304) match authentication information stored at the authentication server 306. The example authentication server 306 sends a response 308 to the profile manager 130 that indicates whether the credentials are authenticated.

When the authentication server 306 determines that the user is permitted to access the SDN network 100 based on the provided credentials, the example switch updater 134 sends a configuration instruction 310 to configure the SDN switch 116 to permit access to the SDN network 100 from the CPE 114 and/or the device 106. For example, the configuration instruction 310 may instruct the SDN switch 116 that traffic from the CPE 114 is authorized to access the networks 118, 120. In contrast, when the authentication server 306 does not determine that the user 110 is permitted to access the SDN network 100 based on the provided credentials, the switch updater 134 sends a configuration instruction 310 to the SDN switch 116 to configure the SDN switch 116 to drop traffic received from the CPE 114 (except for authentication traffic for subsequent authentication attempts).

In contrast to known authentication procedures in which the access network 122 acts as an authentication agent, the example consumer services cloud provider 102 enables simplification of the access network 122 by implementing the authentication agent to authenticate the CPE 114.

Figure 4:
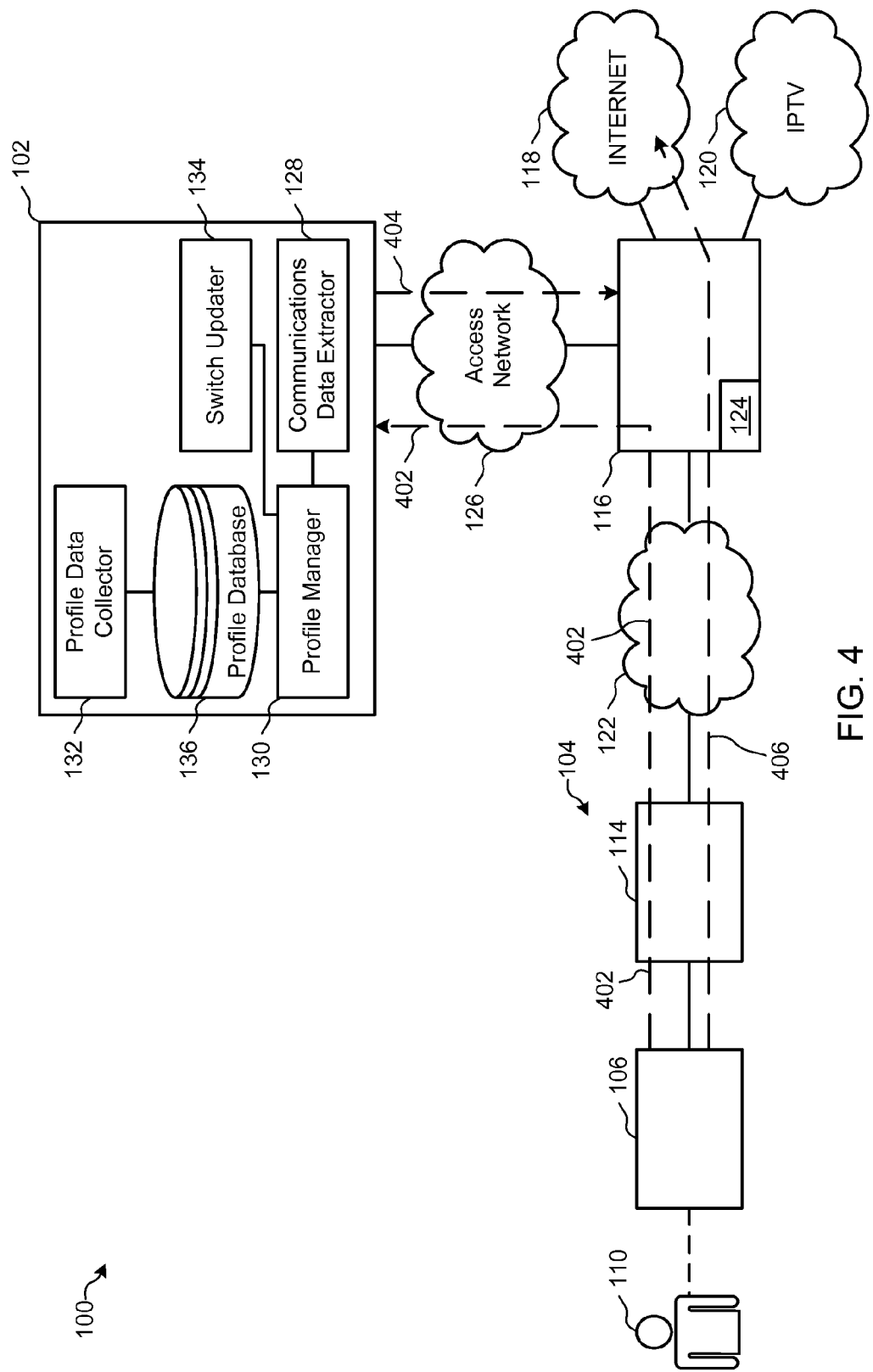
FIG. 4 is an example implementation of the example SDN network of FIG. 1 in which the consumer services cloud provides a value added service such as network address translation by configuring a software-defined networking switch in the SDN network to perform the value added service based on a user profile.

FIG. 4 is an example implementation of the example SDN network 100 of FIG. 1 in which the consumer services cloud provider 102 performs network address translation as a value added service by configuring the SDN switch 116 to perform the network address translation. By performing value added services, the example SDN network 100 can reduce the cost of connecting devices to the SDN network 100. For example, the consumer services cloud provider 102 can configure the SDN switch 116 to provide routing functions to devices connected to the CPE 114 (e.g., the CPE 114 functions as an access point and/or switch for multiple devices in the subscriber premises), which reduces or eliminates the need for the customer to rent or purchase a separate access point or router and saves the customer the associated monetary costs and/or maintenance requirements (e.g., updating, troubleshooting, etc.).

In the example of FIG. 4, the device 106 has a private (e.g., non-public) IP address, such as 19.168.0.1. The example device 106 transmits a first request 402, such as a request for a web page or a request to make a voice call (e.g., via the VoIP protocol). The example CPE 114 forwards the request 402, which has metadata indicating the source IP address as the private IP address of the device 106, to the SDN switch 116. The CPE 114 of FIG. 4 need not perform network address translation or other translation such as port address translation.

The example SDN switch 116 determines whether the forwarding table 124 has an entry to perform network address translation for the private IP address in the request 402. In the example of FIG. 4, the forwarding table 124 does not yet have such a network address translation entry (e.g., because the device 106 has recently connected to the CPE 114, because the device 106 has changed users, because the device has changed private IP addresses, etc.). In some examples, the forwarding table 124 is purged of entries that are older than an age threshold to prompt the consumer services cloud provider 102 to update the forwarding table 124 with network address translation entries.

The example SDN switch 116 re-directs the request 402 to the consumer services cloud provider 102, where the example communications data extractor 128 extracts data and/or metadata from the request 402. In the example of FIG. 4, the communications data extractor 128 extracts the source IP address from the redirected request 402.

The example profile manager 130 identifies the user 110 based on, for example, authentication and/or registration by the user at the private IP address extracted by the communications data extractor 128. The profile manager 130 then retrieves the corresponding user profile from the profile database 136 to determine the user preferences. In the example of FIG. 4, the profile manager 130 may use the user profile to determine that the subscriber premises 104 is registered to use SDN-provided network address translation (e.g., network address translation is not otherwise provided for at the subscriber premises 104).

As mentioned above, the example profile data collector 132 collects data describing subscriptions to services provided by the SDN network 100, such as static IP address leasing by the user 110 and/or registration of networked devices that correspond to a third-party service (e.g., Internet of Things devices) that belong to the user 110. The example profile data collector 132 updates the profile for the user 110 in the profile database 136 to reflect the static IP address assigned to the user 110 and/or the identities of devices at the subscriber premises 104 (for which network address translation may be required for communication with the networks 118, 120).

In the example of FIG. 4, the profile manager 130 determines a public IP address assigned to the user 110 and/or to the subscriber premises 104 based on the user profile. For example, in some cases the user 110 has subscribed to use one or more static IP addresses, which is recorded in the user profile. Alternatively, the subscriber premises 104 may be configured to share a public IP address with other subscribers served by the SDN switch 116 in an effort to conserve available public IP addresses via the SDN network 100. Such an IP address arrangement is recorded in the user profile.

The example switch updater 134 of FIG. 4 sends an instruction message 404 to the SDN switch 116 to cause the SDN switch 116 to implement network address translation for communications transmitted by and destined for the device 106. For example, the instruction message 404 may provide the network address translation table entry to be implemented in the forwarding table 124.

When the SDN switch 116 has been configured, the example SDN switch 116 performs the network address translation on the request 402 and routes the request 402 to the destination network 118, 120. Additionally, the example SDN switch 116 performs network address translation on subsequent traffic 406 (e.g., request messages and/or response messages for which the device 106 is the source and/or destination for the messages).

While the examples of FIG. 4 is described with respect to network address translation services, the example SDN network 100 may provide any other services to the devices 106, 108 at the subscriber premises.

Figure 5:
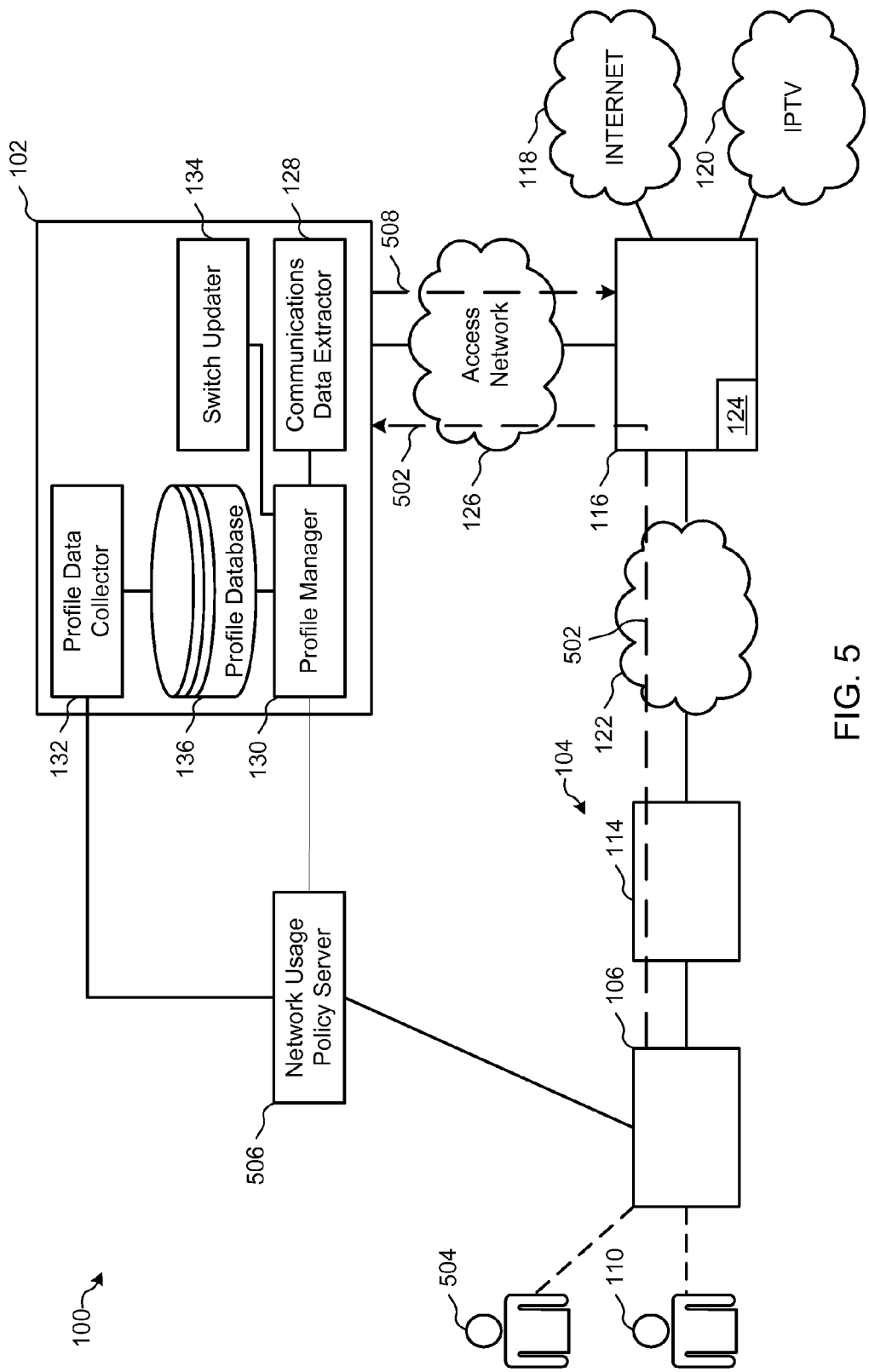
FIG. 5 is another example implementation of the example SDN network of FIG. 1 in which the consumer services cloud provides a value added services such as parental control by configuring a software-defined networking switch in the SDN network to perform the value added service based on a user profile.

FIG. 5 is an example implementation of the example SDN network 100 of FIG. 1 in which the consumer services cloud provider 102 provides a usage restriction service (e.g., a parental control service) by configuring a SDN switch 116 in the SDN network 100 to perform the parental control service. In the example of FIG. 5, the user 110 is a non-administrative user who is subject to network usage restrictions set by an administrator (e.g., restrictions on usage by a child set by a parent). Examples of such restrictions are time-based restrictions (e.g., no access or limited access during certain hours of the day), application-based restrictions (e.g., limits on particular applications), and/or resource restrictions (e.g., limits on URLs that may be requested).

The example device 106 transmits traffic 502 (e.g., a request or response) that is destined for one of the networks 118, 120. The example CPE 114 forwards the traffic 502 to the SDN switch 116. The example SDN switch 116 is initially configured to re-direct the traffic 502 to the consumer services cloud provider 102 for evaluation under a network usage policy. The initial configuration may be performed by the consumer services cloud provider 102 when an administrative user 504 for the subscriber premises 104 requests or subscribes to the network usage policy offered by provider of the SDN network 100.

To configure the network usage policy (e.g., parental control policy), the administrative user 504 logs into an interface provided by a network usage policy server 506 (e.g., via the device 106 or via another device, the CPE 114, the access network 122, the SDN switch 116, the access network 126, and/or the Internet 118). The administrative user 504 may set any desired network usage rules for one or more users at the subscriber premises 104, including any combinations of time-based restrictions (e.g., no access or limited access during certain hours of the day), application-based restrictions (e.g., limits on particular applications), and/or resource restrictions (e.g., limits on URLs that may be requested).

The example network usage policy server 506 provides the specified network usage rules to the profile data collector 132 of the consumer services cloud provider 102 (e.g., via the access network 126, the SDN switch 116, and/or the Internet 118). The example profile data collector 132 modifies the profile for one or more of the users (e.g., for the user 110) in the profile database 136 based on the specified network usage rules.

The example network usage policy server 506 and/or the profile data collector 132 notifies the profile manager 130 that the user profile for the user 110 has changed. The example profile manager 130 retrieves the user profile for the identified user 110 and determines whether the SDN switch 116 is to be configured to enforce the network usage restrictions. If the SDN switch must be configured to enforce the addition of the network usage rules and/or updates to the network usage rules, the example switch updater 134 sends a configuration instruction 508 to the example SDN switch 116. The example configuration instruction 508 updates the forwarding table 124 to, for example, instruct the SDN switch 116 to drop traffic from the user 110 that is not permitted under the network usage rules described in the profile of the user 110.

When the example user 110 sends the traffic 502, the example SDN switch 116 analyzes the traffic 502 (e.g., the data in the traffic such as a requested URL, metadata about the traffic such as the source and/or destination IP addresses and/or the source and/or destination port numbers), an identification of the user 110 associated with the traffic 502 and/or other information associated with the traffic 502 (e.g., a time at which the traffic was sent). Based on the analysis, the example SDN switch 116 determines whether the traffic 502 is to be forwarded or dropped by consulting the forwarding table 124.

In some examples, the SDN switch 116 also forwards the traffic 502 to the consumer services cloud provider 102 for further analysis. For example, in cases in which the network usage rules are configured generically, such as "user X is not permitted to play games after 9 P.M. local time," the network usage rules may not always represent a full list of traffic to be dropped at the SDN switch. For example, new games that use network resources are often introduced, and some games can have configurable network connections (e.g., configurable ports, etc.). The example consumer services cloud provider 102 monitors traffic to determine whether traffic patterns violate any network usage rules and, if so, configures the SDN switch 116 with one or more forwarding rules to enforce the rule network usage rules (e.g., by dropping certain traffic).

To monitor traffic, the example communications data extractor 128 extracts data from the traffic 502 such as source and/or destination IP addresses, source and/or destination ports, protocols used, application types, URLs requested, and/or other data and/or metadata. The example profile manager 130 determines the user 110 to whom the traffic is attributable and retrieves the corresponding user profile from the profile database 136. From the user profile, the example profile manager 130 determines whether the traffic corresponds to a user for whom a network usage rule is in place. When a network usage rule is in place for the user 110, the example profile manager 130 provides the data and/or metadata for the traffic 502 to the network usage policy server 506.

The example network usage policy server 506 analyzes the traffic 502 and/or additional traffic identified by the consumer services cloud provider 102 to identify patterns that match network usage rules. For example, network traffic from certain types of online games typically have data transmission rates and/or data reception rates that fall within a transmission range and/or data packet sizes that fall within a data packet size range. If an unknown service is transmitting and/or receiving data within the transmission range and/or is transmitting and/or receiving traffic that falls within a data packet size range, the example network usage policy server 506 determines that the traffic is a game application. The example network usage policy server 506 provides a definition update to the example profile data collector 132 that updates the definition of what is to be identified as a game application.

For users whose profiles are affected by the updated definition, the example profile data collector 132 updates the user profiles in the profile database 136 with updated information that reflects the game application definition. For example, the profile data collector 132 identifies the profile corresponding to the user 110 as having a network usage rule associated with the updated game application definition. The profile data collector 132 then modifies the rule to incorporate the new game application definition.

Figure 6:
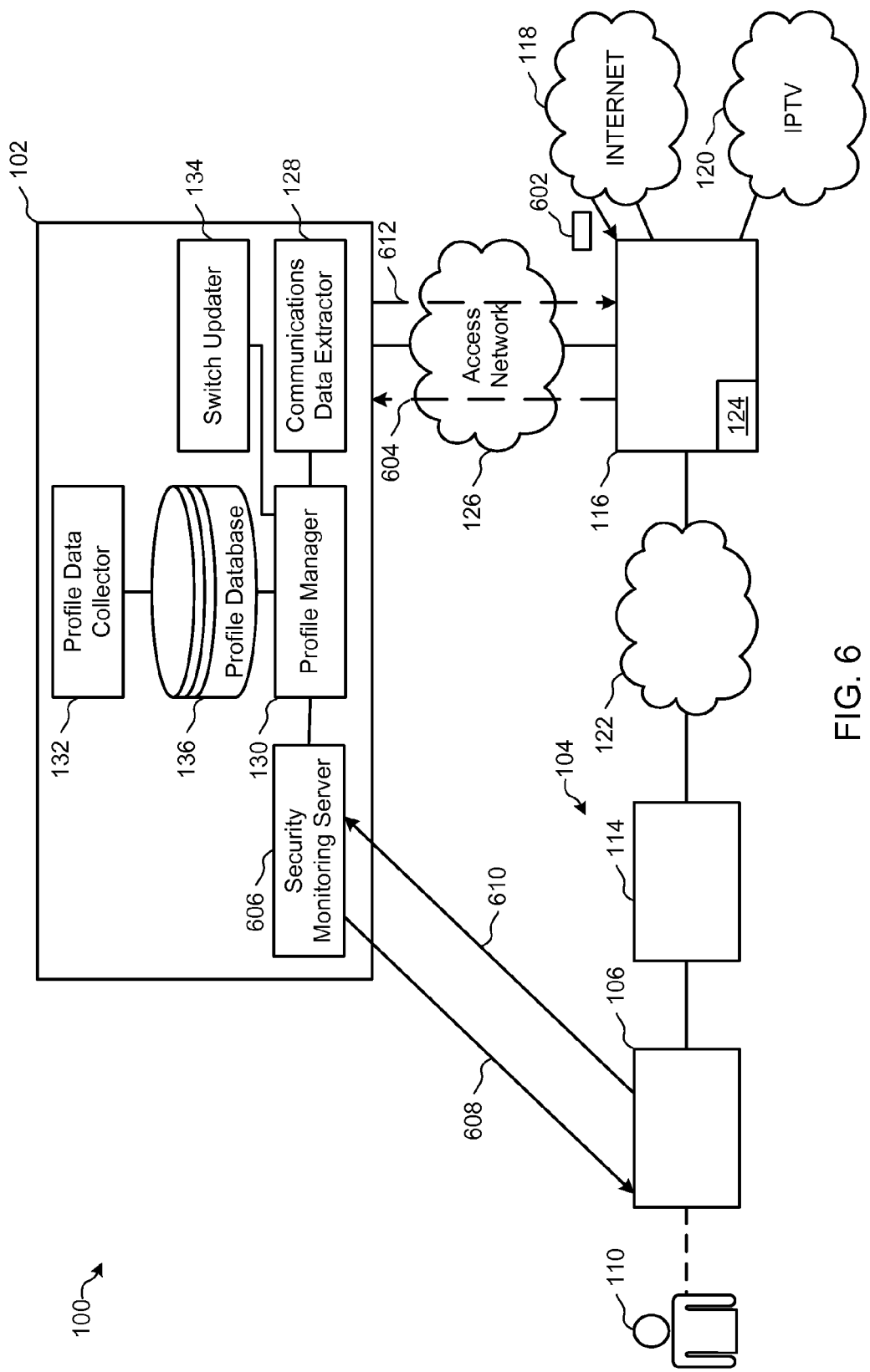
FIG. 6 is an example implementation of the example SDN network of FIG. 1 in which the consumer services cloud provides a value added services such as security monitoring of network traffic by sending a notification to a client device indicating a risk associated with communications traffic received at a software-defined networking switch.

FIG. 6 is an example implementation of the example SDN network 100 of FIG. 1 in which the consumer services cloud provider 102 provides a value added service such as security monitoring of network traffic. When the example consumer services cloud provider 102 identifies a security risk, the consumer services cloud provider 102 sends a notification to the client device 106 indicating a risk associated with the network traffic.

In the example of FIG. 6, the SDN switch 116 is configured to re-direct or mirror traffic that is destined for the device 106 from the Internet 118 to the consumer services cloud provider 102. For example, when a packet 602 is received at the SDN switch 116 from the Internet 118, the SDN switch 116 identifies that the packet 602 is to be forwarded to the CPE 114 based on the data and/or metadata of the packet 602. Based on the data and/or metadata of the packet, the SDN switch 116 also determines that the packet 602 is to be mirrored to the consumer services cloud provider 102, and transmits a copy 604 of the packet 602 to the consumer services cloud provider 102.

The example communications data extractor 128 extracts data and/or metadata from the example copy 604. In the example of FIG. 6, the example profile manager 130 determines that extracted data corresponds to the user 110, the device 106, and/or the subscriber premises 104 (e.g., based on the extracted IP addresses, ports, packet content, etc.). In examples, in which the security monitoring is a subscription service, the profile manager 130 retrieves the corresponding user profile from the profile database 136 to determine whether the user 110 and/or the subscriber premises 104 is subscribed to the service.

When the security monitoring service is to be provided to the user 110 and/or the subscriber premises 104, the example profile manager 130 provides the data to a security monitoring server 606. The example security monitoring server 606 monitors received traffic data and attempts to match the traffic data to patterns of known network threats or risks. Additionally or alternatively, the security monitoring server 606 may attempt to match the traffic to traffic patterns for low risk traffic.

When the example security monitoring server 606 matches traffic (e.g., data representative of the packet 602), the example security monitoring server 606 may take actions such as transmitting a notification 608 of the level of risk to the device 106 (e.g., via the access networks 122, 126, the SDN switch 116, the CPE 114, and/or the Internet 118), instructing the switch updater 134 to configure the SDN switch 116 to block traffic, and/or any other appropriate action. Example notifications 608 may include an indication of whether the traffic matched a known pattern (e.g., known risk, unknown risk) and an indication of the estimated level of risk (e.g., high risk, low risk). The notification 608 informs the user 110 of the determined risk, to enable the user 110 to make an informed decision regarding his or her network activities and/or device management practices.

In the example of FIG. 6, the user 110 may be provided with an option to block traffic in response to the notification 608 (e.g., to enhance security). If the user requests that the traffic identified in the notification 608 be blocked or permitted, the example device 106 transmits a notification response 610 to the consumer services cloud provider 102. Based on the notification response 610, where the switch updater 134 generates an instruction 612 to the SDN switch 116 to configure the forwarding table 124 to comply with the response 610. For example, the instruction 612 may add an entry to the forwarding table 124 to cause subsequent communications that are the same type as the communications identified in the notification 608 to be dropped or forwarded to the device 106.

Figure 7:
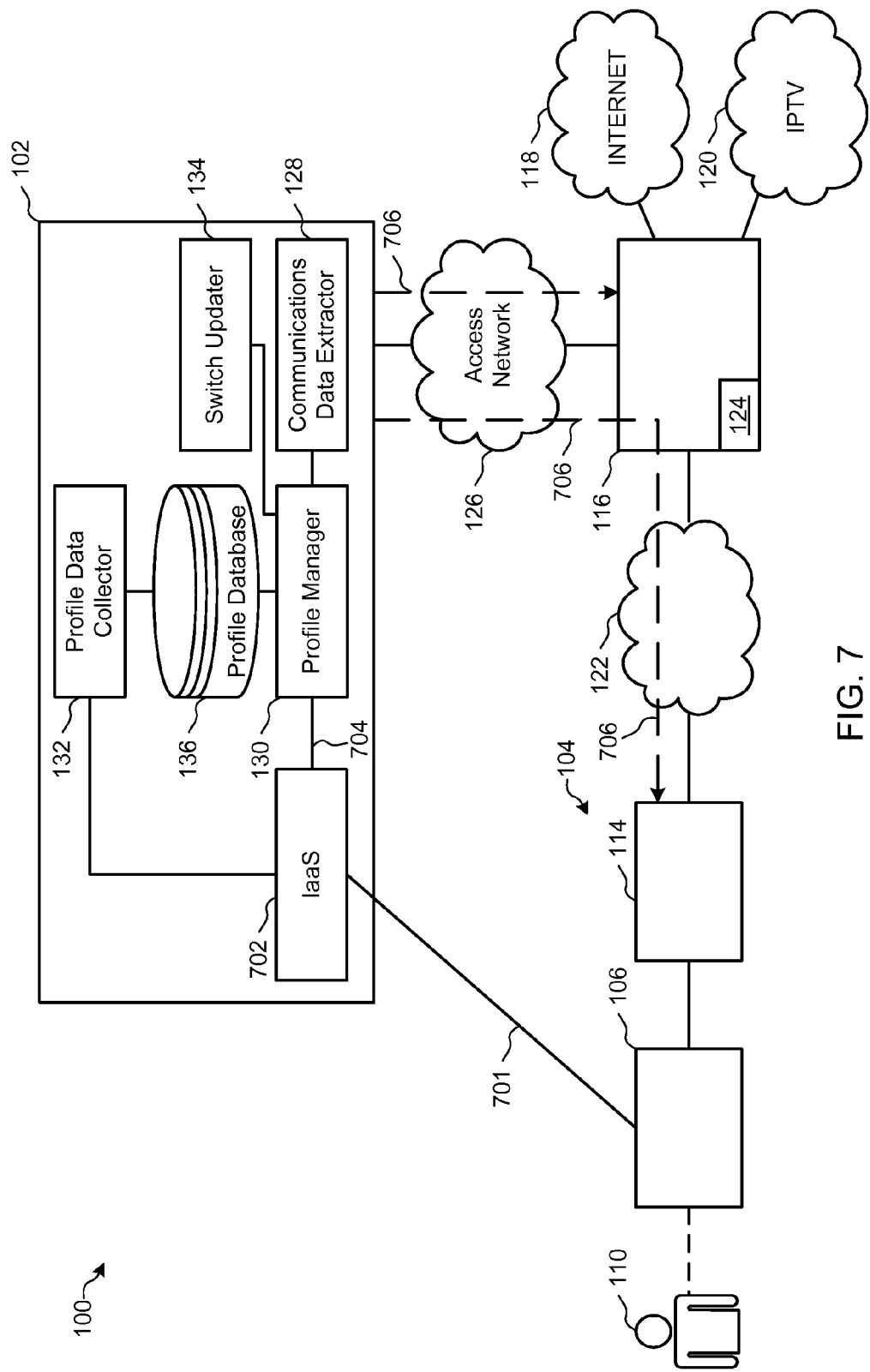
FIG. 7 is an example implementation of the SDN network of FIG. 1 in which the consumer services cloud provider provides infrastructure as a service (IaaS) that appears to be present in a local area network of a device at a subscriber premises.

FIG. 7 is an example implementation of the SDN network 100 of FIG. 1 in which the consumer services cloud provider 102 provides infrastructure as a service (IaaS) that appears to be located on a local area network of the device 106 at the subscriber premises 104. Examples of services that can be provided to a user include network attached storage, personalized application repositories (e.g., personal "app stores"), network-based personal video recorders (NPVR), virtual machines, and/or any other IaaS services. The example SDN network 100 enables the IaaS services to appear on the local area network of the device 106 without requiring additional configuration by the user, such as setting up temporary or permanent virtual private networks with an IaaS system 702.

In the example of FIG. 7, the consumer services cloud provider 102 configures the CPE 114 and/or the SDN switch 116 to route local area network traffic 701 (e.g., OSI model layer 2 traffic and/or layer 3 traffic) between the device 106 and an IaaS system 702. The example IaaS system 702 of FIG. 7 includes multiple servers and/or other devices that are used to provide the IaaS services, such as storage, processing, and/or communications capabilities. The example user 110 accesses the example IaaS system 702 to request access to one or more services provided by the IaaS system 702.

The example IaaS system 702 reports service information 704 to the example profile data collector 132. The service information 704 may identify of the services to which the subscriber is subscribing (e.g., service types), the subscriber (e.g., a subscriber identifier, an IP address, etc.), and the provider of the services (e.g., an identity of the provider, an IP address of an access point at which the services can be accessed, etc.). The example profile data collector 132 updates the user profile(s) in the profile database 136 for users associated with the subscriber (e.g., for the user 110).

The example profile manager 130 accesses the user profile (e.g., in response to a notification from the profile data collector 132 of an updated profile) from the profile database 136. The profile manager 130 provides the IaaS information in the profile to the switch updater 134. The example switch updater 134 sends configuration instructions 706 to the SDN switch 116 and/or to the CPE 114 to cause the SDN switch 116 and/or the CPE 114 to route layer 2 and/or layer 3 communications between the device 106 and the IaaS system 702. For example, the SDN switch 116 and/or the CPE 114 may route status packets between the device 106 and the IaaS system 702 to maintain the virtual local connection between the device 106 and the IaaS system 702.

While the examples of FIGS. 1-7 are described in connection with the device 106 and/or the user 110 connecting to the SDN network 100 via the CPE 114, the example consumer services cloud provider 102 may additionally or alternatively provide the value added services based on the user profile when the device 106 is not connected via the CPE 114. For example, the consumer services cloud provider 102 may provide services specified in the user profile for the user 110 when the device 106 is a portable device or mobile device that can be connected to the SDN network 100 via other access points, such as public wired and/or wireless access points and/or wireless communications base stations. In such examples, an instance of the consumer services cloud provider 102 that is connected to the SDN switch 116 currently serving the device 106 accesses the profile of the user 110 to determine the appropriate services. When the services are identified, the instance of the consumer services cloud provider 102 configures the SDN switch 116 that is serving the device 106 to provide the services in the same or similar manner as when the device 106 is located in the subscriber premises 104. For example, the instance of the consumer services cloud provider 102 may configure an instance of the forwarding table in the SDN switch to forward and/or drop traffic in accordance with the services to be provided.

In this manner, the example SDN network 100 can extend personalized services to the user 110 regardless of the location of the user 110. For example, by configuring the appropriate SDN switch 116 based on the access point used by the user 110, the example SDN network 100 can enable the use of a subscriber's static IP address, provide secure access to personal LAN-based services and/or infrastructure via public networks, and/or provide any other personalized service at virtually any network-accessible location.

While an example manner of implementing the consumer services cloud provider 102 of FIG. 1 is illustrated in FIGS. 1, 2, 3, 4, 5, 6, and 7, one or more of the elements, processes and/or devices illustrated in FIGS. 1, 2, 3, 4, 5, 6, and 7 may be combined, divided, re-arranged, omitted, eliminated and/or implemented in any other way. Further, the example SDN switch 126, the example communications data extractor 128, the example profile manager 130, the example profile data collector 132, the example switch updater 134, the example profile database 136, the example networked services 138, the example policy server 204, the example authentication server 306, the example network usage policy server 506, the example security monitoring server 606, the example IaaS system 702 and/or, more generally, the example consumer services cloud provider 102 of FIGS. 1-7 may be implemented by hardware, software, firmware and/or any combination of hardware, software and/or firmware. Thus, for example, any of the example SDN switch 126, the example communications data extractor 128, the example profile manager 130, the example profile data collector 132, the example switch updater 134, the example profile database 136, the example networked services 138, the example policy server 204, the example authentication server 306, the example network usage policy server 506, the example security monitoring server 606, the example IaaS system 702 and/or, more generally, the example consumer services cloud provider 102 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example SDN switch 126, the example communications data extractor 128, the example profile manager 130, the example profile data collector 132, the example switch updater 134, the example profile database 136, the example networked services 138, the example policy server 204, the example authentication server 306, the example network usage policy server 506, the example security monitoring server 606, and/or the example IaaS system 702 is/are hereby expressly defined to include a tangible computer readable storage device or storage disk such as a memory, a digital versatile disk (DVD), a compact disk (CD), a Blu-ray disk, etc. storing the software and/or firmware. Further still, the example consumer services cloud provider 102 of FIGS. 1-7 may include one or more elements, processes and/or devices in addition to, or instead of, those illustrated in FIGS. 1-7, and/or may include more than one of any or all of the illustrated elements, processes and devices.

Figure 8:
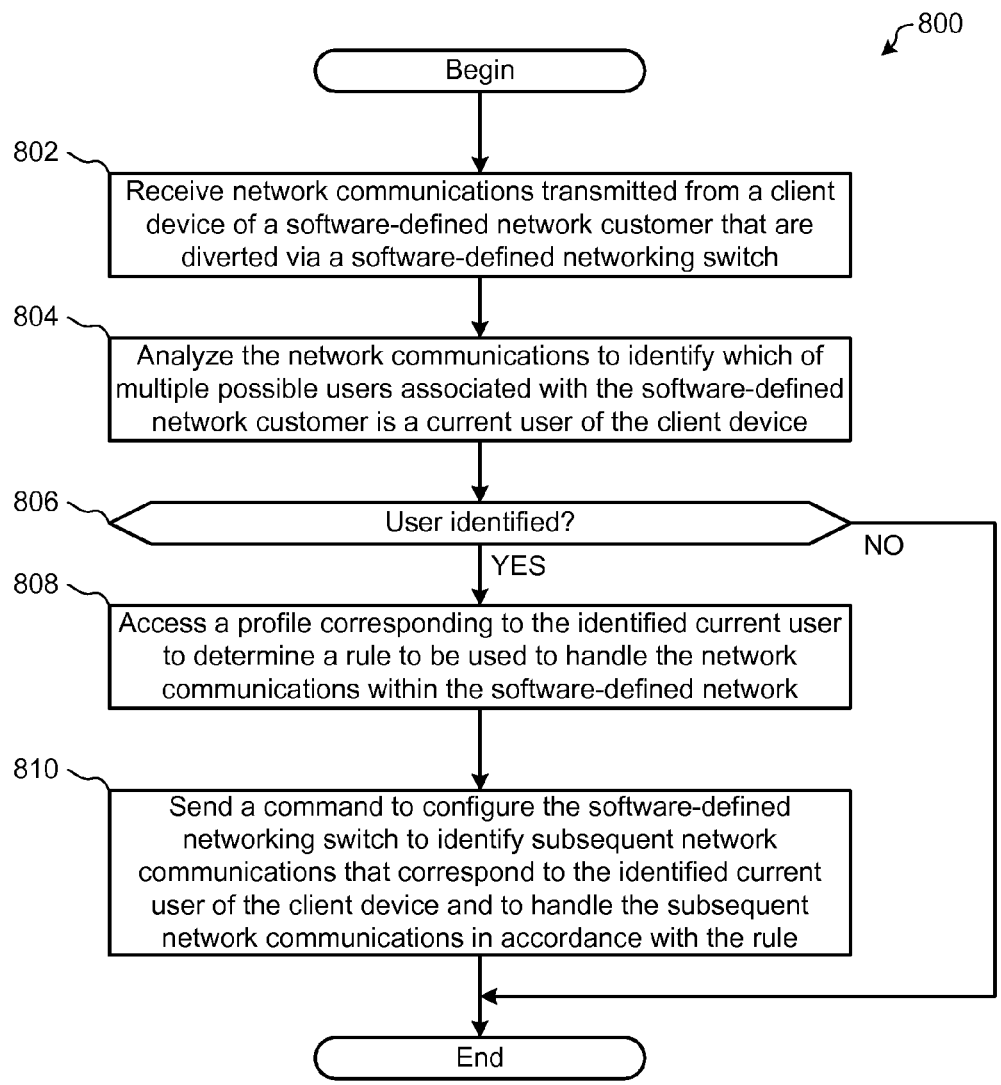
FIG. 8 is a flowchart representative of example machine readable instructions which may be executed to implement the consumer services cloud providers of FIGS. 1-7 to configure the SDN network.
Figure 9:
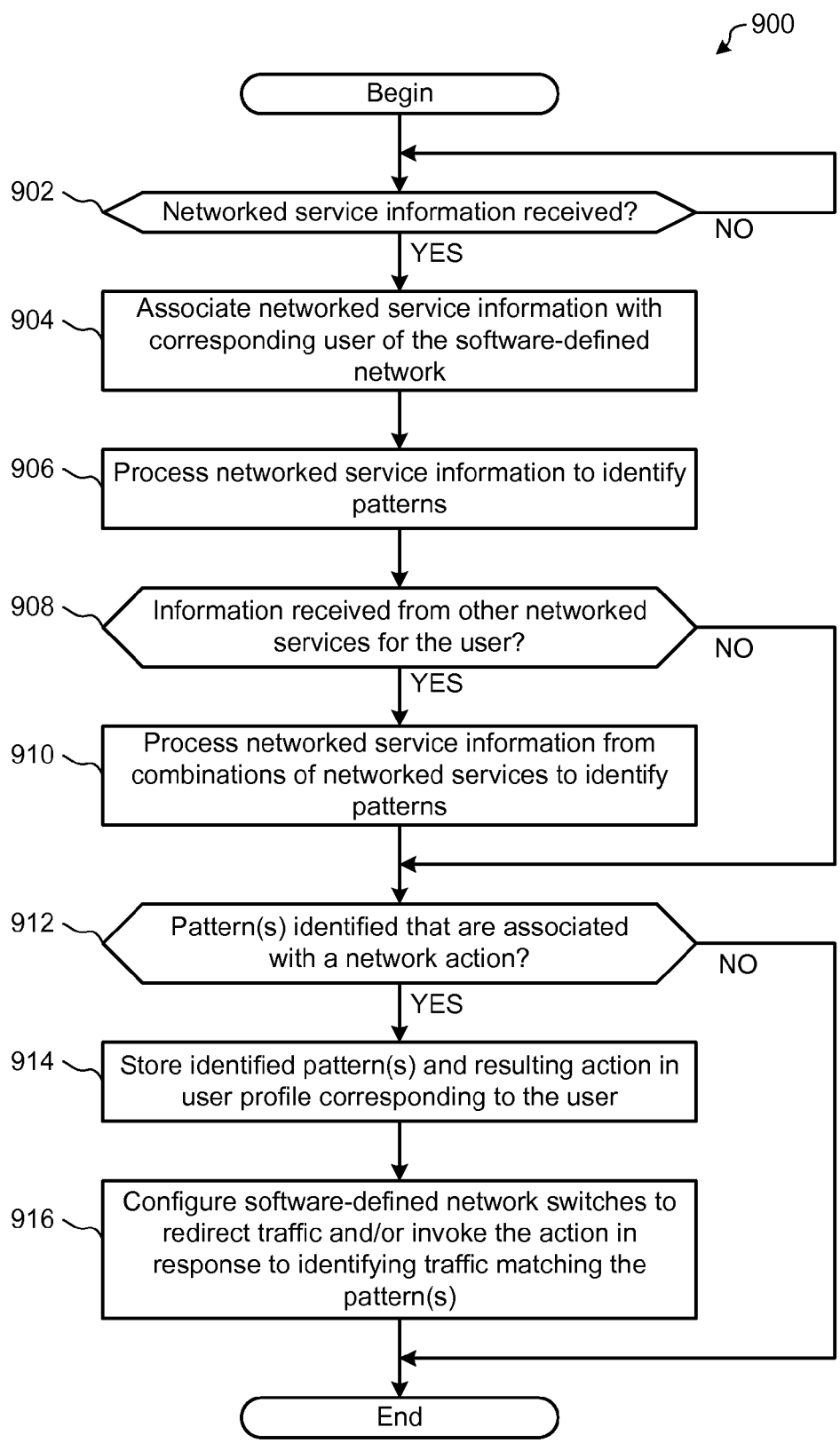
FIG. 9 is a flowchart representative of example machine readable instructions which may be executed to implement the profile data collector of FIGS. 1-7 to configure the SDN network based on patterns identified from networked services.

Flowcharts representative of example machine readable instructions for implementing the consumer services cloud provider 102 of FIGS. 1-7 is shown in FIGS. 8 and 9. In this example, the machine readable instructions comprise programs for execution by a processor such as the processor 1012 shown in the example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIGS. 8 and/or 9, many other methods of implementing the example consumer services cloud provider 102 may alternatively be used. For example, the order of execution of the blocks may be changed, and/or some of the blocks described may be changed, eliminated, or combined.

As mentioned above, the example processes of FIGS. 8 and/or 9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 8 and/or 9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

FIG. 8 is a flowchart representative of example machine readable instructions 800 which may be executed to implement the consumer services cloud provider 102 of FIGS. 1-7 to configure the SDN network 100.

The example communications data extractor 128 of FIG. 1 receives network communications transmitted from a client device (e.g., the device 106 of FIG. 1) of a software-defined network customer (e.g., a customer or subscriber of the SDN network 100, such as the users 110, 112) that are diverted via the SDN switch 116 (block 802). For example, the device 106 may send a request for a network resource accessible via the Internet 118 or the IPTV network 120 of FIG. 1. The SDN switch 116 re-directs the request from the device 106 based on a configured forwarding rule.

The example profile manager 130 analyzes the network communications to identify which of multiple possible users (e.g., users 110, 112) associated with the SDN customer is a current user of the client device 106 (block 804). For example, the profile manager 130 may analyze data and/or metadata corresponding to the network communications such as source and/or destination IP addresses, source and/or destination ports, requested URLs, protocols, applications, a subscriber agreement, SDN network policies, authentication information, a device registration table (e.g., a DHCP clients table), and/or any other information that may be obtained and/or derived from the network communications alone and/or in combination with other communications.

When a user is identified (block 806), the example profile manager 130 accesses a profile corresponding to the identified current user to determine a rule to be used to handle the network communications within the SDN network 100 (block 808). For example, the profile manager 130 retrieves a profile corresponding to the identified user from the profile database 136. The profile may include information indicating forwarding rules that are to be applied to the communications from the user 110, which may be different than forwarding rules to be applied to the same or similar communications for other users and/or other subscribers.

The example switch updater 134 of FIG. 1 configures the SDN switch 116 to identify subsequent network communications that correspond to the identified current user 110 of the device 106, and to handle the subsequent network communications in accordance with the rule (block 810). For example, the switch updater 134 may create and send an instruction message to modify the forwarding table 124 of the SDN switch 116 to recognize the specific communications from the user 110 and/or the device 106, and to forward or drop such communications to comply with the rule. Examples of configuring the SDN switch 116 to comply with different forwarding rules are discussed above with reference to FIGS. 2-7.

After configuring the SDN switch 116 (block 810), or if a user cannot be identified (block 806), the example instructions 800 of FIG. 8 end. The example instructions 800 may be repeated for subsequent network communications.

FIG. 9 is a flowchart representative of example machine readable instructions 900 which may be executed to implement the profile data collector 132 of FIGS. 1-7 to configure the SDN network 100 based on patterns identified from networked services.

The example profile data collector 132 determines whether networked service information has been received (block 902). For example, the profile data collector 132 may receive networked service information via an API or other interface through which the networked service(s) 138 of FIG. 1 can provide information. Example networked service information may include home automation data (e.g., configurations of home automation devices), software services and/or preferences, and/or mobile network information. If no networked service information has been received (block 902), control loops to block 902 to continue monitoring for networked service information.

When networked service information is received (block 902), the example profile data collector 132 associates the networked service information with a corresponding user of the SDN network 100 (block 904). The networked service information indicates which of the user(s) 110, 112 and/or the subscriber premises 104 to which the networked service information is related.

The profile data collector 132 processes the networked service information to identify one or more patterns (block 906). For example, the profile data collector 132 may attempt to identify patterns of behavior in the networked service information that could enable predictive functions. An example pattern of behavior may be structured as "when event X occurred, event Y occurred within M minutes afterward." Another example pattern of behavior may be structured as "when event X occurred, system A was in state S."

The profile data collector 132 also determines whether information has been received from other networked services 138 for the same user (block 908). For example, a user may instruct multiple services to provide networked service information to the profile data collector 132. When information has been received from other networked services 138 for the same user (block 908), the profile data collector 132 processes networked service information from combinations of the networked services 138 to identify patterns. For example, the profile data collector 132 may attempt to identify patterns of behavior between multiple systems, such as a home security system being armed prior to starting of an automotive telematics system.

After processing the networked service information from combinations of the networked services 138 (block 910), or if information has not been received from multiple networked services 138 for the same user (block 908), the example profile data collector 132 determines whether any identified pattern(s) are associated with a network action (block 912). For example, the profile data collector 132 may determine whether any of the actions involved in a recognized pattern can be initiated via a network communication, such as remotely arming a home security system via the SDN network 100.

When pattern(s) are identified as associated with a network action (block 912), the example profile data collector 132 stores the identified pattern(s) and the resulting actions in a user profile corresponding to the user (block 914). For example, the profile data collector 132 may update a user profile in the profile database 136 that corresponds to the user.

The example switch updater 134 of FIG. 1 sends a command to configure one or more SDN switches (e.g., the SDN switch 116) to redirect traffic and/or to invoke the action in response to identifying traffic matching the pattern (block 916). For example, the switch updater 134 may provide an instruction message to the SDN switch 116. The instruction messages updates the forwarding table 124 such that the SDN switch 116 forwards traffic that corresponds to an identified pattern to the consumer services cloud provider 102 to trigger the resulting action via a network communication.

After configuring the SDN switches (block 916), or if none of the identified patterns are associated with a network action (block 912), the example instructions 900 end. In some examples, the instructions 900 return control to block 902 to resume monitoring for networked service information.

Figure 10:
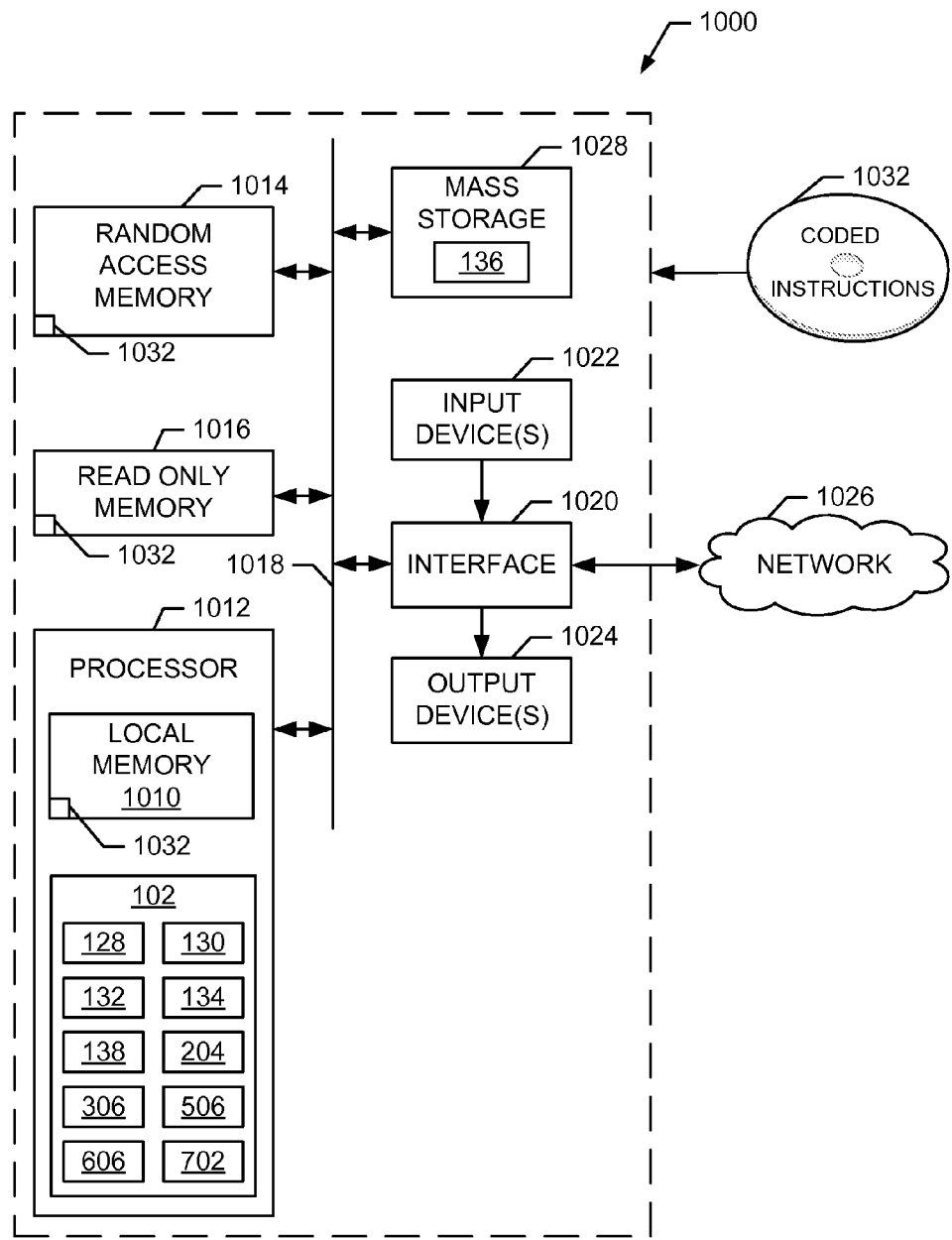
FIG. 10 is a block diagram of an example processor platform capable of executing the instructions of FIGS. 8 and/or 9 to implement the consumer services cloud provider of FIGS. 1, 2, 3, 4, 5, 6, and/or 7.

FIG. 10 is a block diagram of an example processor platform 1000 capable of executing the instructions of FIGS. 8 and 9 to implement the example communications data extractor 128, the example profile manager 130, the example profile data collector 132, the example switch updater 134, the example networked services 138, the example policy server 204, the example authentication server 306, the example network usage policy server 506, the example security monitoring server 606, the example IaaS system 702 of FIGS. 1-7, and/or portions thereof. The processor platform 1000 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives. The example mass storage devices 1028 of FIG. 10 may implement the profile database 136 of FIGS. 1-7.

The coded instructions 1032 of FIGS. 8 and 9 may be stored in the mass storage device 1028, in the volatile memory 1014, in the non-volatile memory 1016, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
   obtaining, at a first device in a communications network, network communications transmitted from a client device of a communications network customer that are diverted via a software-defined networking switch;
   analyzing the network communications to identify which of multiple possible users associated with the communications network customer is a current user of the client device, wherein the analyzing of the network communications includes analyzing at least one of an Internet protocol header and a control message;
   in response to identifying the current user, accessing subscription information for the communications network customer to determine a rule to be used to handle the network communications within the communications network; and
   configuring the software-defined networking switch to:
      identify subsequent network communications that correspond to the identified current user of the client device; and
      route the subsequent network communications to the communications network in compliance with the subscription information.

2. The method defined in claim 1, wherein the analyzing of the network communications includes identifying authentication information in a request for access to the communications network from the client device, and, the configuring of the software-defined networking switch includes configuring the software-defined networking switch to route communications between the client device and the communications network when client device is authorized to access the communications network based on the authentication information.

3. The method defined in claim 1, wherein the analyzing of the network communications includes analyzing at least one of a message header and a control message, the determining of the rule includes accessing network address translation information for the communications network customer, and the configuring of the software-defined networking switch includes configuring the software-defined networking switch to perform network address translation on the subsequent communications.

4. The method defined in claim 1, wherein the analyzing of the network communications includes analyzing at least one of a message header, a control message, or a type of an application that generated the network communications, the determining of the rule includes accessing user network access control information configured by an authorized person associated with the communications network customer, and the configuring of the software-defined networking switch includes configuring a forwarding table of the software-defined networking switch to selectively block the subsequent network communications to comply with the user network access control information.

5. The method defined in claim 1, wherein the network communications are first network communications, and the method further includes:
   obtaining, at the first device, second network communications destined for the client device that are diverted by the software-defined networking switch;
   analyzing the second network communications based on a security rule to identify a security risk of the second network communications;
   transmitting a notification to the client device including an identification of the security risk; and
   configuring a forwarding table of the software-defined networking switch to comply with a response obtained from the client device to the notification.

6. The method defined in claim 1, wherein the configuring of the software-defined networking switch to handle the subsequent network communications in accordance with the rule includes configuring the software-defined networking switch to route the subsequent network communications without re-directing the subsequent network communications to the first device.

7. The method defined in claim 1, wherein the client device includes a computing device connected to the communications network via customer premises equipment.

8. The method defined in claim 1, wherein the client device includes a mobile device connected to the communications network via a wireless communications network base station.

9. An apparatus, comprising:
a processor; and
a computer readable storage medium including computer readable instructions which, when executed, cause the processor to perform operations including:
analyzing network communications transmitted from a client device of a communications network customer to identify which of multiple possible users associated with the communications network customer is a current user of the client device, the network communications being diverted to the apparatus by a software-defined networking switch;
in response to identifying the current user, accessing a first profile corresponding to the identified current user to determine a rule to be used to handle the network communications within the communications network;
processing information from a networked service to identify a pattern;
storing at least one of the pattern and an action that is responsive to the pattern in association with the identified current user; and
configuring the software-defined networking switch to:
identify subsequent network communications that correspond to the identified current user of the client device;
handle the subsequent network communications in accordance with the rule; and
take the action based on identifying traffic corresponding to the pattern and the identified current user.

10. The apparatus defined in claim 9, wherein the client device includes a computing device connected to the communications network via customer premises equipment.

11. The apparatus defined in claim 9, wherein the client device includes a mobile device connected to the communications network via a wireless communications network base station.

12. The apparatus defined in claim 9, wherein the processing of the information from the networked service to identify the pattern includes processing information from multiple, separate networked services to identify behaviors associated with the multiple, separate networked services.

13. A tangible computer readable storage medium comprising computer readable instructions which, when executed, cause a processor of a first device to perform operations including:
analyzing network communications to identify which of multiple possible users associated with a communications network customer is a current user of a client device, the network communications including at least one of an Internet Protocol header and a control message, the network communications transmitted from the client device of the communications network customer, and the network communications being diverted to the first device by a software-defined networking switch;
in response to identifying the current user, accessing a first profile corresponding to the identified current user, and, accessing network address translation information for the communications network customer to determine a rule to be used to handle the network communications within the communications network; and
configuring the software-defined networking switch to:
identify subsequent network communications that correspond to the identified current user of the client device;
perform network address translation on the subsequent network communications; and
handle the subsequent network communications in accordance with the rule.

14. The storage medium defined in claim 13, wherein the analyzing of the network communications includes analyzing at least one of a message header and a control message, the determining of the rule includes accessing subscription information for the communications network customer, and the configuring of the software-defined networking switch includes configuring the software-defined networking switch to route the subsequent network communications to the communications network in compliance with the subscription information.

15. The storage medium defined in claim 13, wherein the analyzing of the network communications includes identifying IEEE 802.1X authentication information in a request for access to the communications network from the client device, and, the configuring of the software-defined networking switch includes configuring the software-defined networking switch to route communications between the client device and the communications network when the client device is authorized to access the communications network based on the IEEE 802.1X authentication information.

16. The storage medium defined in claim 13, wherein the network communications are first network communications and the operations further include:
analyzing second network communications based on a security rule to identify a security risk of the second network communications, the second network communications having the client device as a destination and being diverted by the software-defined networking switch;
when the security risk satisfies a threshold risk, transmitting a notification to the client device identifying the security risk; and
configuring a forwarding table of the software-defined networking switch to comply with a response obtained from the client device to the notification.

17. The storage medium defined in claim 13, wherein the configuring of the software-defined networking switch to handle the subsequent network communications in accordance with the rule includes configuring the software-defined networking switch to route the subsequent network communications without re-directing the subsequent network communications to the first device.

* * * * *